United States Patent
Borowski

Patent Number: 5,480,161
Date of Patent: Jan. 2, 1996

[54] SHAFT SEAL WITH CONTROLLED POROSITY ELEMENTS

[75] Inventor: Richard Borowski, Rochester, N.Y.

[73] Assignee: Garlock Inc, New York, N.Y.

[21] Appl. No.: 77,177

[22] Filed: Jun. 15, 1993

[51] Int. Cl.[6] .................................................... F02F 11/00
[52] U.S. Cl. ............................ 277/53; 277/23; 277/55; 277/65; 277/56
[58] Field of Search ............................ 277/53, 55, 56, 277/23, 215, 232, 227, 65

[56] References Cited

U.S. PATENT DOCUMENTS

| | | |
|---|---|---|
| 1,917,987 | 7/1933 | Large . |
| 3,825,364 | 7/1974 | Halila et al. .............................. 277/53 |
| 4,817,966 | 4/1989 | Borowski .................................. 277/3 |
| 4,852,890 | 8/1989 | Borowski .................................. 277/25 |
| 4,943,068 | 7/1990 | Hatch et al. .............................. 277/23 |
| 5,024,451 | 6/1991 | Borowski .................................. 277/53 |
| 5,244,216 | 9/1993 | Rhode ...................................... 277/53 |

FOREIGN PATENT DOCUMENTS

| | | | |
|---|---|---|---|
| 1476220 | 4/1989 | U.S.S.R. .................................. 277/23 |
| 2009339 | 6/1979 | United Kingdom .................... 277/53 |

Primary Examiner—William A. Cuchlinski, Jr.
Assistant Examiner—Keith Hwang
Attorney, Agent, or Firm—Howard S. Reiter; Richard W. Watson

[57] ABSTRACT

A labyrinth type seal assembly having one or more controlled porosity elements retained in the labyrinth pathway between relatively rotatable seal elements. Preferably the controlled porosity elements are formed of open celled foam material such as polyurethane. The controlled porosity elements assist in preventing the ingress of contaminating solid or liquid materials, the loss of sealed materials and the flooding or overloading of drain ports.

9 Claims, 3 Drawing Sheets

SHAFT SEAL WITH CONTROLLED POROSITY ELEMENTS

FIELD OF THE INVENTION

The present invention relates to rotary shaft seals which prevent lubricants associated with shaft bearings from leaking externally of the bearing housing as well as preventing foreign particles in the environment from working themselves through the seal and into the lubricant. More particularly, the invention concerns labyrinth type seals and the use of controlled porosity material retained between rotor and stator seal elements to help regulate and control fluid and particle movement.

BACKGROUND OF THE INVENTION

Many years ago, bearings were often sealed by using a felt or similar sealing element positioned in contact with a rotary shaft and typically held in place by a metal shell. More recently, shaft bearings have mostly been sealed either with flexible lip seals or with labyrinth seals. However, each of these seals presents various operational problems. More specifically, lip seals have a finite and unpredictable life, they damage the surface on which the lip runs, they increase power consumption because of running torque, and they have limited temperature and speed capabilities. Drawbacks to labyrinth seals include an open path which does not totally prevent ingress of contaminants, a limited capacity to accommodate shaft misalignment and run out and an inability to handle fluid levels above the drain port or ports.

In prior labyrinth assemblies there have been instances in which excessive amounts of lubricant or other fluids have entered the labyrinth pathway in such volume that all of the fluid was unable to drain back into the internal cavity through the interior drain ports. In such instances, the excess fluid continues outwardly along the labyrinth pathway until it ultimately escapes from the exterior end of the labyrinth pathway or through an exterior drain port. In a somewhat similar manner, particulate contaminants of fluid and/or solid form have sometimes been able to pass inwardly along the labyrinth pathway to ultimately contaminate the internal cavity and its bearings.

SUMMARY OF THE INVENTION

Many of these problems have been overcome by the present invention in which controlled porosity structures are retained between rotor and stator seal elements. These structures may be microcellular material of open cell foam or of a fibrous nature and they inhibit ingress of contaminating materials, whether of solid or liquid form, from outside the seal assembly and control the movement of fluid from inside the seal assembly. In this manner, drain ports cannot be flooded and fluid does not pass outwardly between the stator and rotor members.

It is thus a primary object of the invention to provide a shaft seal which will overcome the inherent shortcomings of both lip seals and labyrinth seals presently in use. Further objects of the invention are to provide a seal with improved speed and temperature capabilities. Another object of the invention is to provide a seal which uses less power due to less running friction or torque.

DETAILED DESCRIPTION OF THE INVENTION

Figure 1:
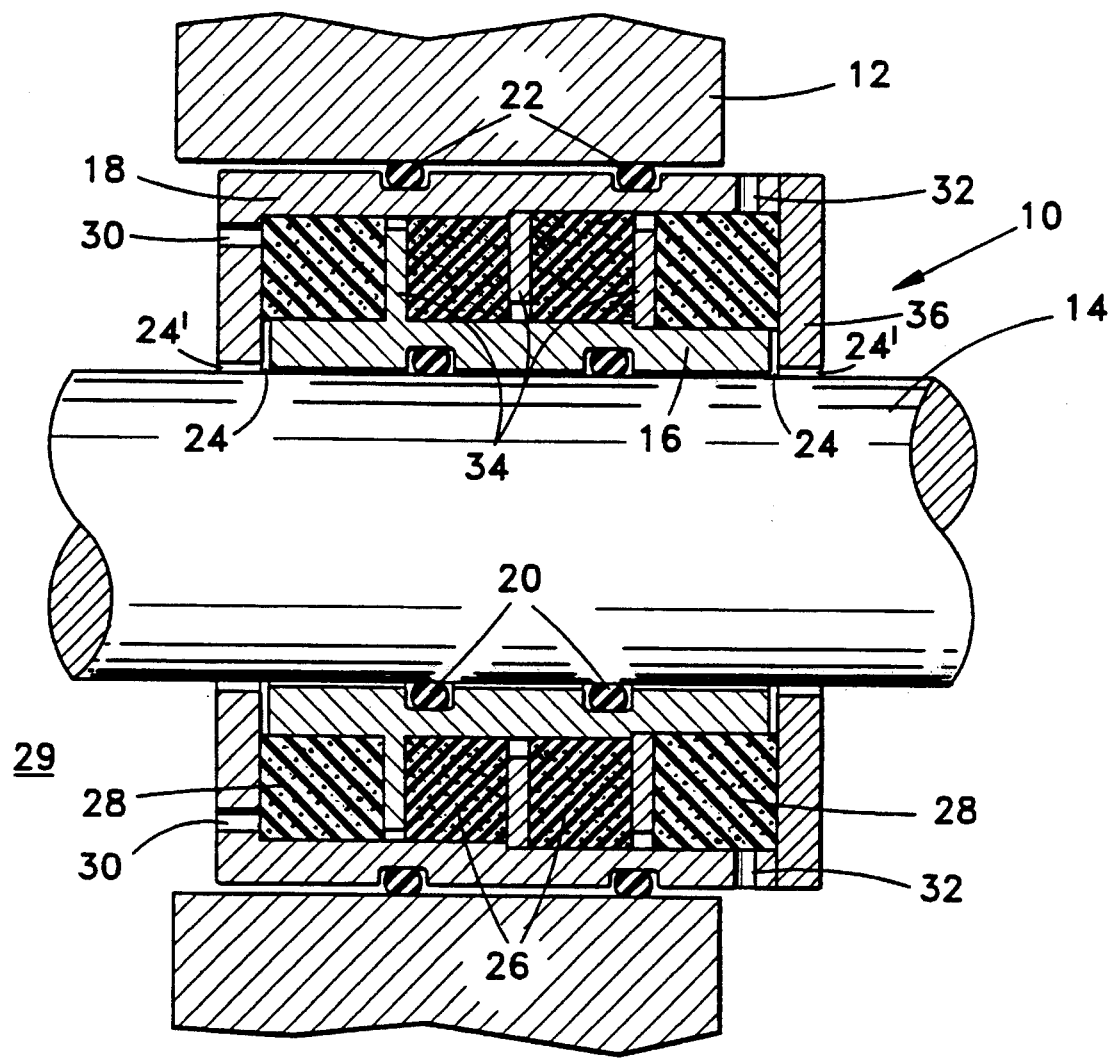
FIG. 1 is a cross-sectional view of a seal according to the invention.

Referring first to FIG. 1, a preferred embodiment of the invention is illustrated. A sealing assembly 10 is positioned between a housing 12 and a relatively rotating shaft 14. Seal assembly 10 is of the labyrinth type and includes an inner member 16 which rotates with shaft 14 and an outer stationary member 18. O-rings 20 provide sealing between inner member 16 and shaft 14, while O-rings 22 provide sealing between outer member 18 and housing 12. In labyrinth pathway 24 located between members 16 and 18 and having entrances 24' are disposed a pair of relatively dense foam elements 26 and a pair of less dense foam elements 28. The foam of elements 26 and 28 is of the open-celled type.

Relatively dense foam elements 26 are placed in the axially central or interior portion of pathway 24 while less dense elements 28 are placed in the exterior portions of pathway 24, respectively axially inward and outward of elements 26. By appropriate selection of pore size of elements 28, the rate of flow of fluid and/or particulate material in the exterior portions of pathway 24 is controlled. In this manner, the capacity of drain ports 30 and/or 32 is not exceeded. The smaller pore size or greater density of elements 26 substantially prevents material flow along the interior portion of pathway 24 between ports 30 and 32. As compared to prior labyrinth seals, it is necessary to provide wider axial separation of labyrinth baffle members 34 in order to provide space for foam elements 26 and 28. In order to facilitate assembly of seal 10, baffles 34 may preferably be made as separate elements and cemented, welded or otherwise fixed in place during the assembly process. End plate or baffle 36 is similarly fixed to the axially outer end of outer seal member 18. The embodiment of FIG. 1 will be particularly useful in applications where radial space between the housing and the shaft is limited.

Figure 2:
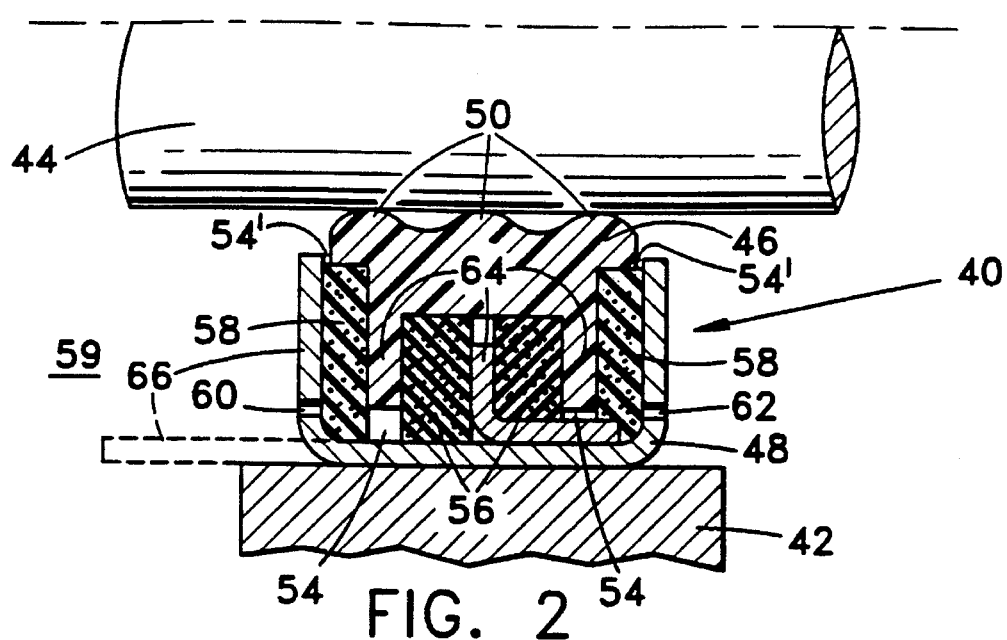
FIG. 2 is a partial cross-sectional view of an alternative seal according to the invention.

A second embodiment of the invention is shown in FIG. 2 in which seal assembly 40 includes an inner rotary seal member 46 and an outer stationary seal member 48. Ridges 50 on the I.D. of member 46 provide for sealing between shaft 44 and seal assembly 40 and a press fit provides for sealing between housing 42 and the O.D. of seal assembly 40. In pathway 54, located between rotor and stator members 46 and 48 and having entrances 54' are disposed relatively dense foam elements 56 and less dense foam elements 58. As in the embodiment of FIG. 1, the less dense foam elements 58 control the rate of flow of fluids and/or particulate material in the outer portions of pathway 54, while the more dense elements 56 substantially prevent flow along the inner portion of pathway 54 between drain ports 60 and 62. Generally, it is believed preferable that foam elements 56 and 58 be bonded to stator 48 so that they do not rotate. As in the embodiment of FIG. 1, baffles 64 are axially spaced apart to accommodate foam elements 56 and 58. However, in this embodiment, baffles 64 may be integral or pre-attached parts of the seal members 46 and 48 and the assembly is unitized by rolling over an end portion of member 48 to form an end plate or baffle 66.

Figure 3:
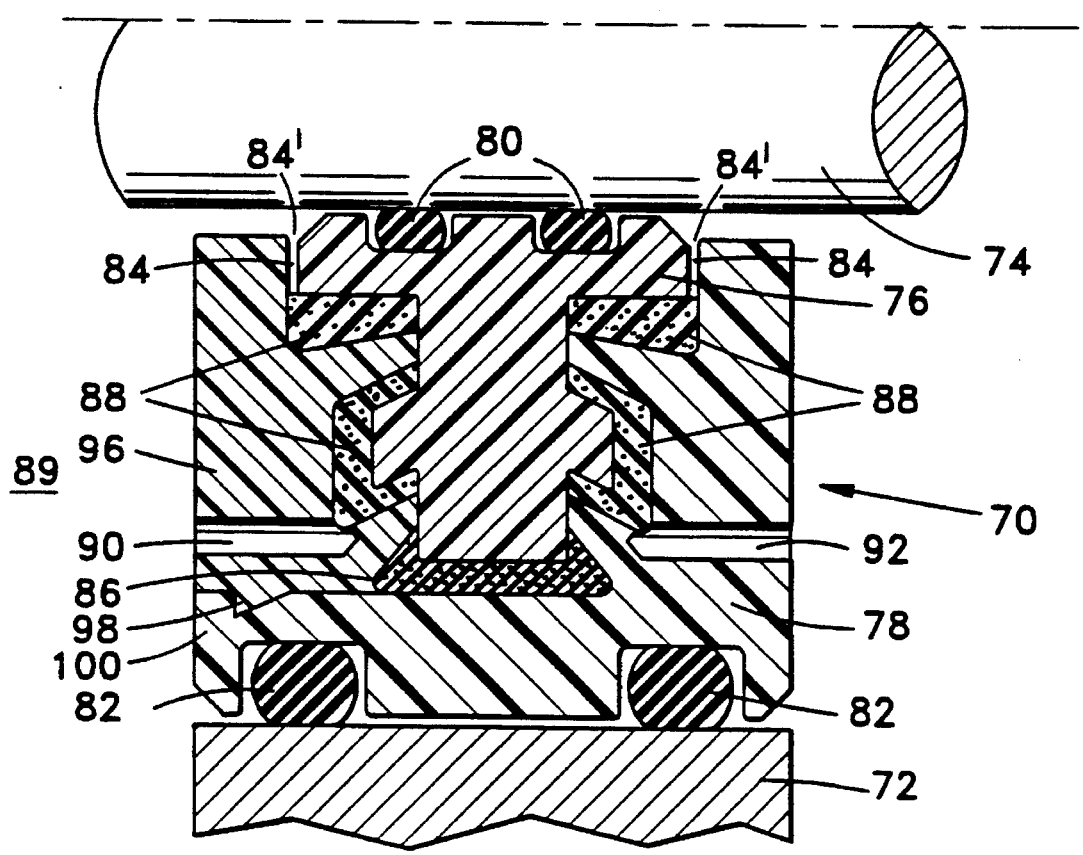
FIG. 3 is a partial cross-sectional view of a third seal according to the invention.

Turning now to FIG. 3, another embodiment in the form of an isolator seal is shown. While several of the various elements of the assembly are of different shape or form, this embodiment includes all of the elements described in FIG. 1 and all function in substantially the same manner. Thus, seal assembly 70 is positioned between housing 72 and shaft 74 and includes an inner rotor element 76 and an outer stator member 78. Inner O-rings 80 seal between inner element 76 and shaft 74 while outer O-rings 82 seal between outer element 78 and housing 72. Pathway 84, having entrances 84' lies between rotor element 76 and stator element 78 and four less dense foam elements 88 are situated in the outer portions of pathway 84 while a single more dense foam element 86 is positioned in the central part of pathway 84 between the less dense elements 88 and between expulsion or drain ports 90 and 92. In this particular embodiment, end plate or baffle 96 is held in place by means of a ridge 98 and a flexible snap lock portion 100 of stator 78.

Figure 4:
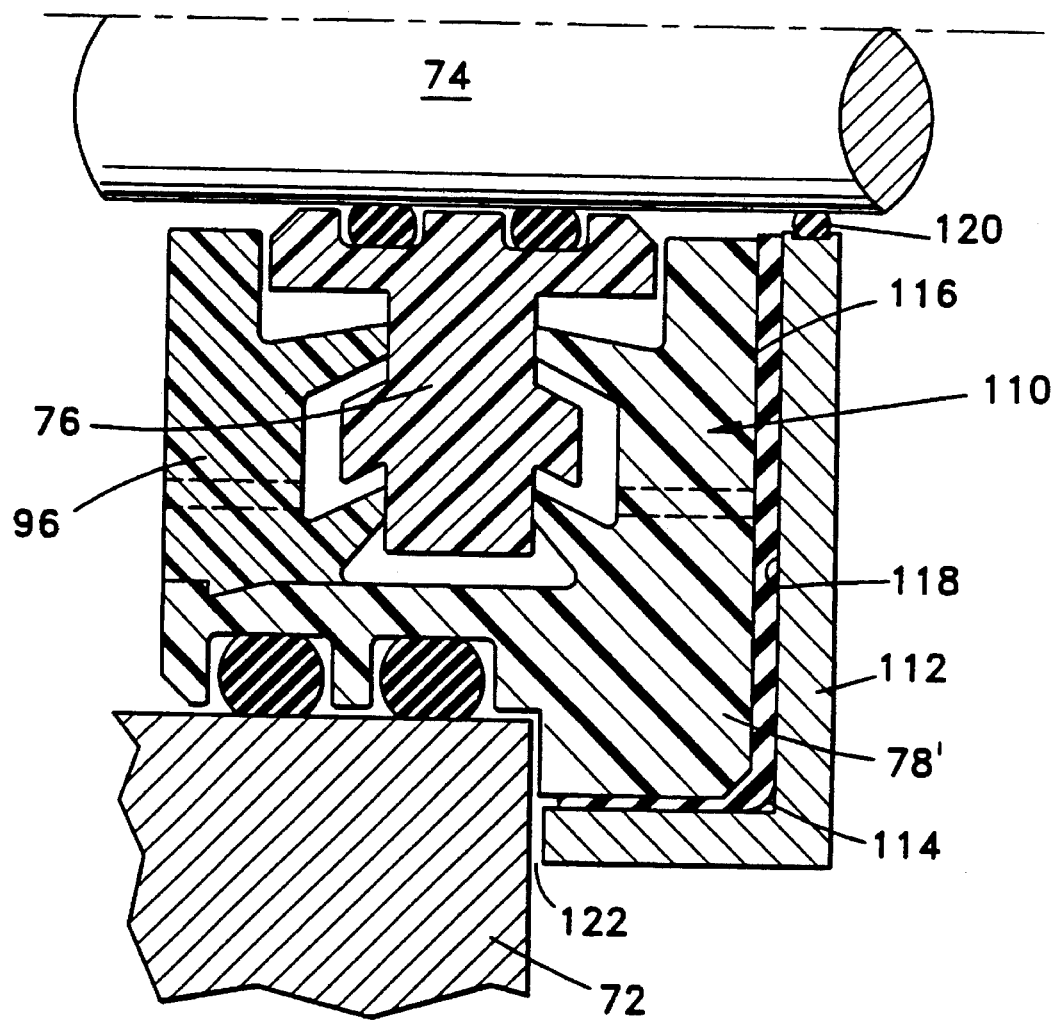
FIG. 4 is a partial cross-sectional view of a further alternative seal according to the invention.

A further modification of the invention is shown in FIG. 4 wherein an isolator seal assembly 110 is similar to that of FIG. 3 except that stator 78' has been slightly altered to fit a different portion of housing 72 and the assembly has as an added component an outboard shroud 112 adapted to rotate with shaft 74. In this modification, instead of modifying a standard seal assembly to accommodate the controlled porosity elements, a single such element 114 is installed between the outer face 116 of seal assembly 110 and the inner face 118 of shroud 112. Seal ring 120 serves as means to drive shroud 112 with shaft 74 and to require contaminated external fluids to enter the seal assembly via passageway 122 and through porous element 114. The appropriate density of porous element 114 will be determined by the conditions of the fluids to be sealed and excluded. Under the most extreme conditions such a shroud and external foam element could be used to supplement any of the assemblies of FIGS. 1–3.

A variety of materials may be used to fabricate the several components of the seal assemblies. The rotor and stator elements may be made of a variety of engineering thermoplastic or thermoset materials or of suitable metals or alloys. Presently, polyetherether ketone (PEEK) and polytetrafluoroethylene (PTFE) are preferred materials. The O-ring seals may be made of various elastomers or resilient plastic resins. Aside from resilience, the primary criteria are resistance to any chemical or mechanical affect of the fluids being handled and facilitation of assembly. In similar manner, the foam elements may be made of a variety of materials. A presently preferred material is polyurethane. However, other resins such as polysulfone and polyethylene may be used as long as they have appropriate chemical and thermal resistance. Also, fibrous materials may be used alone or in combination with resins. Again, chemical and thermal resistance are limiting factors. Of more significance in these cases is the degree of porosity of the foam or fibrous elements. Thus, pore size for the lower density foam elements should be greater than 100 microns (0.004") in diameter and it is believed that preferred pore sizes for such elements will be on the order of 500 to 600 microns (0.020" to 0.023') in diameter to control or impede the rate of fluid and particle movement through the outer portions of the pathway between the rotor and the stator so that the drain or expulsion ports do not become overloaded or flooded. For the higher density foam elements, pore sizes should be less than 100 microns (0.004") in order to substantially stop the movement of fluids and particles through the axially central portion of the labyrinth pathway between the drain or expulsion ports.

While preferred embodiments of the invention have been shown and described in detail, other modifications will be readily apparent to those skilled in the sealed bearing art. For example, if it is anticipated that large quantities of airborne particulate material are to be encountered outside the seal, it may be desirable to use a high density foam element in place of the axially outer low density foam elements described and shown. In similar manner, if the sealed fluid is heavily loaded with particulate material, the axially inner foam elements may be made of high density foam. Under some circumstances, a lesser number of foam elements may be used and they may all be of the same density. Upon occasion, a single porous element may be sufficient. Another alternative would be to use the seal assembly of the invention in combination with an ordinary lip seal, especially under extreme flood conditions. Thus, the preceding specification should be interpreted as exemplary rather than as limiting and the scope of the invention is defined by the following claims.

I claim:

1. A labyrinth type seal assembly comprising radially inner and outer relatively rotatable seal elements and at least two bodies of controlled porosity microcellular foam material retained in and substantially filling at least an axially outer portion of a pathway between said seal elements, at least one of said bodies being of lessser density than at least one other of said bodies, and positioned such that fluids and materials entering said pathway first encounter a body of said lesser density foam material and said radially outer seal element having at least one drain port located radially outwardly of an entrance to said pathway so that fluids and particulate materials entering said pathway through said entrance may escape from said pathway through said at least one drain port after passing through a body of said controlled porosity microcellular foam material.

2. A labyrinth type seal assembly comprising radially inner and outer relatively rotatable seal elements and at least two bodies of controlled porosity fibrous material retained in and substantially filling at least an axially outer portion of a pathway between said seal elements, at least one of said bodies being of lessser density than at least one other of said bodies, and positioned such that fluids and materials entering said pathway first encounter a body of said lesser density foam material and said radially outer seal element having at least one drain port located radially outwardly of an entrance to said pathway so that fluids and particulate materials entering said pathway through said entrance may escape from said pathway through said at least one drain port after passing through a body of said controlled porosity fibrous material.

3. A labyrinth type seal assembly having radially inner and outer relatively rotatable seal elements and a plurality of bodies of controlled porosity material retained in and substantially filling at least a portion of a labyrinthine pathway between said seal elements, at least one of said bodies being of lesser density than at least one other of said bodies and positioned in an axially outward position relative to said at least one greater density body, said outer seal element having at least one drain port located radially outwardly of an entrance to said pathway so that fluids and particulate materials entering said pathway through said entrance may escape from said pathway through said at least one drain port after passing through a body of said lesser density controlled porosity material.

4. The seal assembly according to claim 3 wherein said controlled porosity material comprises microcellular foam material.

5. The seal assembly according to claim 3 wherein said greater density microcellular foam material has pore sizes less than 100 microns.

6. The seal assembly according to claim 5 wherein said lesser density microcellular foam material has pore sizes greater than 100 microns.

7. The seal assembly according to claim 5 wherein said lesser density microcellular roam material has pore sizes between 500 and 600 microns.

8. The seal assembly according to claim 3 wherein said controlled porosity material comprises fibrous material.

9. The seal assembly of claim 3 wherein said assembly further includes an outer shroud and at least a portion of said controlled porosity material is retained between said shroud and the remaining portion of said seal assembly.

* * * * *